(12) United States Patent
Vincent et al.

(10) Patent No.: US 12,253,173 B2
(45) Date of Patent: Mar. 18, 2025

(54) SHAFT SEAL SYSTEM (71) Applicant: Woodex Bearing Company, Inc., Georgetown, ME (US)

(72) Inventors: Corey Vincent, West Bath, ME (US); Matthew Potvin, Brunswick, ME (US)

(73) Assignee: Woodex Bearing Company, Inc., Georgetown, ME (US)

( * ) Notice: Subject to any disclaimer, the term of this patent is extended or adjusted under 35 U.S.C. 154(b) by 99 days.

(21) Appl. No.: 17/744,577

(22) Filed: May 13, 2022

(65) Prior Publication Data

US 2023/0258266 A1 Aug. 17, 2023

Related U.S. Application Data

(60) Provisional application No. 63/310,079, filed on Feb. 14, 2022.

(51) Int. Cl.
*F16J 15/34* (2006.01)

(52) U.S. Cl.
CPC ....... *F16J 15/3488* (2013.01); *F16J 15/3464* (2013.01); *F16J 15/3484* (2013.01)

(58) Field of Classification Search
CPC ........ F16J 15/34; F16J 15/3464; F16J 15/348; F16J 15/3484; F16J 15/3488; F16J 15/38
See application file for complete search history.

(56) References Cited

U.S. PATENT DOCUMENTS

| | | | | | |
|---|---|---|---|---|---|
| 2,853,020 | A | * | 9/1958 | Hollinger | F16J 15/36 |
| | | | | | 277/408 |
| 3,591,188 | A | * | 7/1971 | Eisner | F16J 15/3404 |
| | | | | | 277/408 |
| 3,988,026 | A | * | 10/1976 | Kemp, Jr. | F16J 15/3472 |
| | | | | | 277/374 |
| 4,410,188 | A | * | 10/1983 | Copes | F16J 15/3488 |
| | | | | | 277/366 |
| 4,809,992 | A | * | 3/1989 | Kemp, Jr. | F16J 15/54 |
| | | | | | 277/377 |

(Continued)

FOREIGN PATENT DOCUMENTS

| | | | | |
|---|---|---|---|---|
| CN | 108443510 A | * | 8/2018 | ............... F16J 15/10 |
| CN | 115095665 A | * | 9/2022 | |

(Continued)

OTHER PUBLICATIONS

International Search Report and Written Opinion dated Jun. 7, 2023 issued by the Korean Intellectual Property Office in related International Application No. PCT/US2023/012859; filed Feb. 11, 2023.

*Primary Examiner* — Nicholas L Foster
(74) *Attorney, Agent, or Firm* — Gordon Rees Scully & Mansukhani, LLP (57) ABSTRACT

A seal assembly for a rotating shaft of a device. The seal assembly configured to prevent the passage of a fluid along the rotating shaft. The seal assembly including a seal housing surrounding the rotating shaft and a drive ring mounted onto the rotating shaft via a drive collar. The drive collar is configured to be nested within a rotor assembly, and the rotor assembly is disposed within the seal housing. The drive collar includes a flange configured to impart torque the rotor assembly when the rotating shaft rotates.

20 Claims, 14 Drawing Sheets

(56) References Cited

U.S. PATENT DOCUMENTS

| | | | |
|---|---|---|---|
| 5,238,253 A * | 8/1993 | Sieghartner | F16J 15/3404 |
| | | | 415/113 |
| 5,409,241 A * | 4/1995 | Bowers | F16J 15/24 |
| | | | 277/366 |
| 5,549,305 A | 8/1996 | Freund | |
| 5,865,441 A | 2/1999 | Orlowski | |
| 6,109,617 A * | 8/2000 | Laney | F16J 15/342 |
| | | | 277/369 |
| 6,315,297 B1 * | 11/2001 | Conway | F04D 29/106 |
| | | | 277/362 |
| 8,033,549 B2 * | 10/2011 | Huang | F16J 15/3484 |
| | | | 277/408 |
| 2016/0312898 A1 * | 10/2016 | Shah | F16J 15/324 |
| 2018/0087393 A1 * | 3/2018 | Garrison | F01D 11/003 |

FOREIGN PATENT DOCUMENTS

| | | |
|---|---|---|
| EP | 1 316 747 A2 | 6/2003 |
| JP | 09-049573 A | 2/1997 |

* cited by examiner

SHAFT SEAL SYSTEM

CROSS-REFERENCE TO RELATED APPLICATION

The present disclosure relates to a seal system, specifically a rotary shaft seal This application claims the benefit of U.S. Provisional Patent Application No. 63/310,079, filed Feb. 14, 2022, which is incorporated by reference herein in its entirety.

GENERAL DESCRIPTION

The present disclosure relates to a seal system, specifically a rotary shaft seal system.

It is conventional practice in a rotary device with a rotary shaft to interpose a rotary seal arrangement at the device wall to prevent contamination or passage of materials within the device through the area traversed by the rotary shaft. In a conventional rotary seal, a rotating member is pressed against a static surface whereby fluids or solids are precluded from passing through the interface between the static and rotating components of the seal. Conventional systems typically contain difficult to replace wear items and components. Conventional systems also lack tolerance from thermal and mechanical stresses. Thus, there is a demand for improvement on rotary shaft seal systems. An example of an existing seal system is disclosed in U.S. Pat. No. 5,409,241, which is incorporated by reference herein. Some of the auxiliary systems and components described in the foregoing patent application (e.g., purge gas systems) may be incorporated in the improved design described herein.

An object of the disclosed system is to provide an adaptive seal system that is less expensive to maintain. The improved system is described in more detail below.

BRIEF DESCRIPTION OF THE DRAWINGS

The features, aspects, and advantages of the disclosed shaft seal system will become apparent from the following description, and the accompanying exemplary embodiments shown in the drawings, which are briefly described below.

DETAILED DESCRIPTION

According to one embodiment, a seal assembly for a rotating shaft is disclosed. The seal assembly comprising a seal housing surrounding the rotating shaft, a drive ring mounted onto the rotating shaft via a drive collar, the drive collar configured to be nested within a rotor assembly. The rotor assembly is disposed within the seal housing. The drive collar includes a projection configured to impart torque the rotor assembly when the rotating shaft rotates.

The embodiments of the seal assembly disclosed herein are configured to prevent the passage of fluids along a rotating shaft, and in certain embodiments seal or contain a fluid within the device. The disclosed embodiments may also be used to accommodate situations (such as when the device includes a vacuum chamber) where the seal assembly is configured to prevent the passage of fluid into the device via the rotational shaft.

According to another embodiment a seal assembly for a rotating shaft, the seal assembly comprising a seal housing surrounding the rotating shaft, a drive ring mounted onto the rotating shaft via a drive collar, the drive collar configured to be nested within a pusher ring assembly, the pusher ring assembly is disposed within the seal housing. The pusher ring assembly includes reinforcement pins extending through the pusher ring assembly. A first outer rotor attached to the reinforcement pin at a first end of the pusher ring. A second outer rotor attached to the reinforcement pin at a second end of the pusher ring. The drive collar comprising a projection configured to impart torque to the pusher ring assembly when the rotating shaft rotates. The pusher ring is configured to impart torque to the first and second outer rotors when the rotating shaft rotates via the drive collar.

According to another embodiment a seal assembly for a rotating shaft of a device is disclosed. The seal assembly includes a seal housing surrounding the rotating shaft, a gland follower fastened onto the housing, a sealing base fastened onto the device, wherein the seal housing is fastened onto the sealing base. A first seal face, wherein the gland follower is fastened onto the first seal face. A second seal face fastened onto the sealing base. A drive ring mounted onto the rotating shaft via a drive collar. An outer rotating seal component configured to be rotationally locked to the drive collar, wherein the outer rotating seal component is configured to rotate relative to the first seal face and second seal face when the rotating shaft of the device rotates.

The embodiments disclosed herein may be employed in a variety of applications and rotating process machinery and used as mixer seals, dryer seals, conveyor seals, extruder seals, blender seals, paper pulper seals, turbine deals, and pump seals, including devices that include vacuum chambers that have a substantial differential pressure with the surrounding atmosphere, for example. The embodiments of the shaft seal assemblies disclosed may be used to effectively seal dry powders, bulk materials, pastes, slurries, liquids and vapors, including aromatic hydrocarbons.

Figure 1:
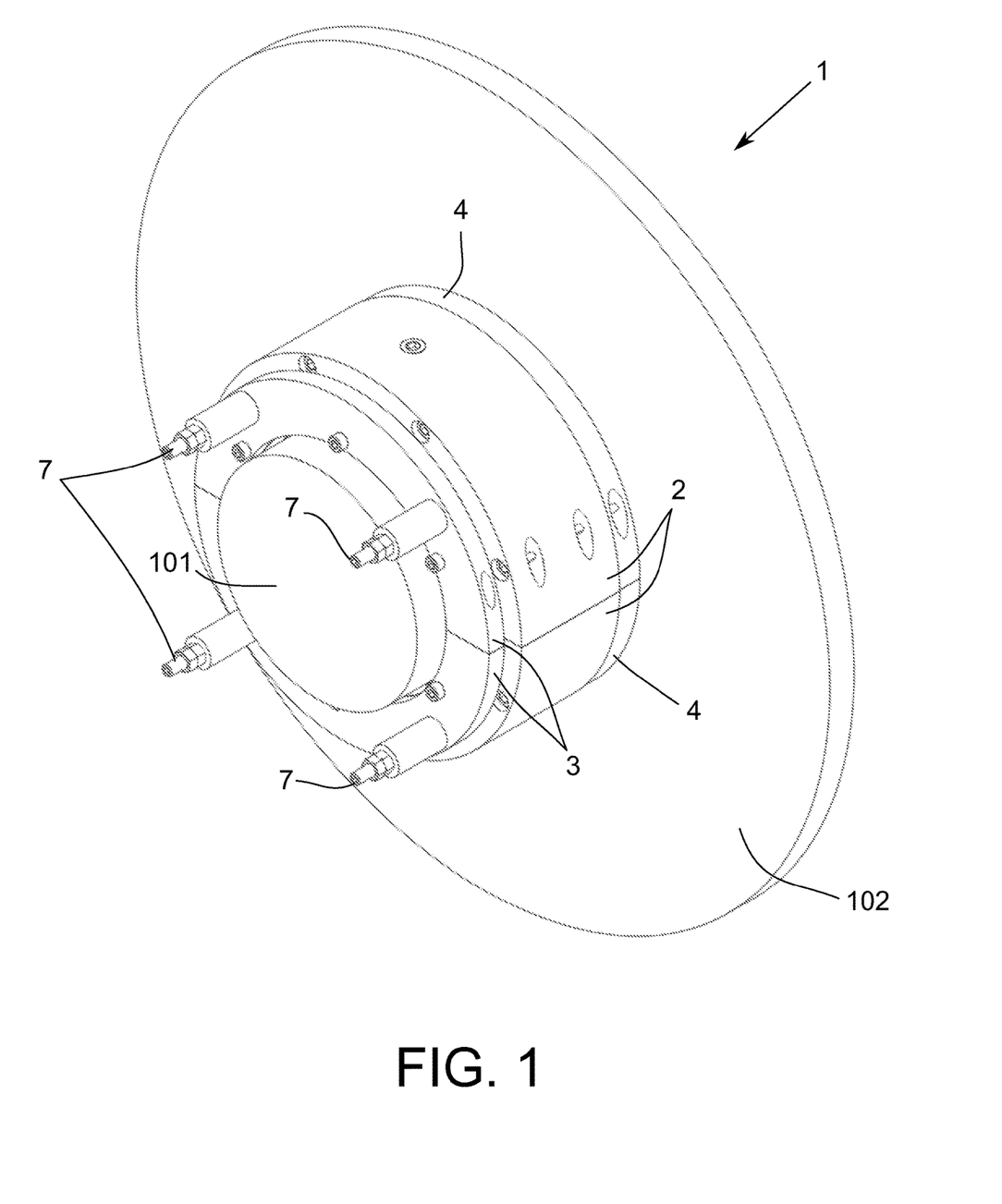
FIG. 1 shows an exemplary rotary shaft seal system.

FIG. 1 is a rotary shaft seal system 1 attached to a device having a rotating shaft 101. As mentioned above, the device may be, for example, a mixer, a dryer, conveyor, an extruder, a blender, a paper pulper, a turbine, a motor, a generator, a pump, etc. The rotary shaft seal system 1 is configured to circumferentially surround a portion of the shaft 101 adjacent to a device wall 102. The fluid to be contained may be located on the opposite side of the device wall 102 from the shaft seal system. The various components of the system are secured in place via various fastening mechanisms (e.g., nuts and bolts) that connect different parts as described herein.

The rotary shaft seal system includes a housing 2, a gland follower 3, and a sealing base 4. The sealing base may be fastened onto the device wall 102. The gland follower 3 may be fastened to the housing 2. In one embodiment spring bolts 7 may be configured to attach the gland follower 3 onto the housing 2. The spring bolts 7 are configured to bias the gland follower 3 to the internals of the seal system 1.

Figure 2:
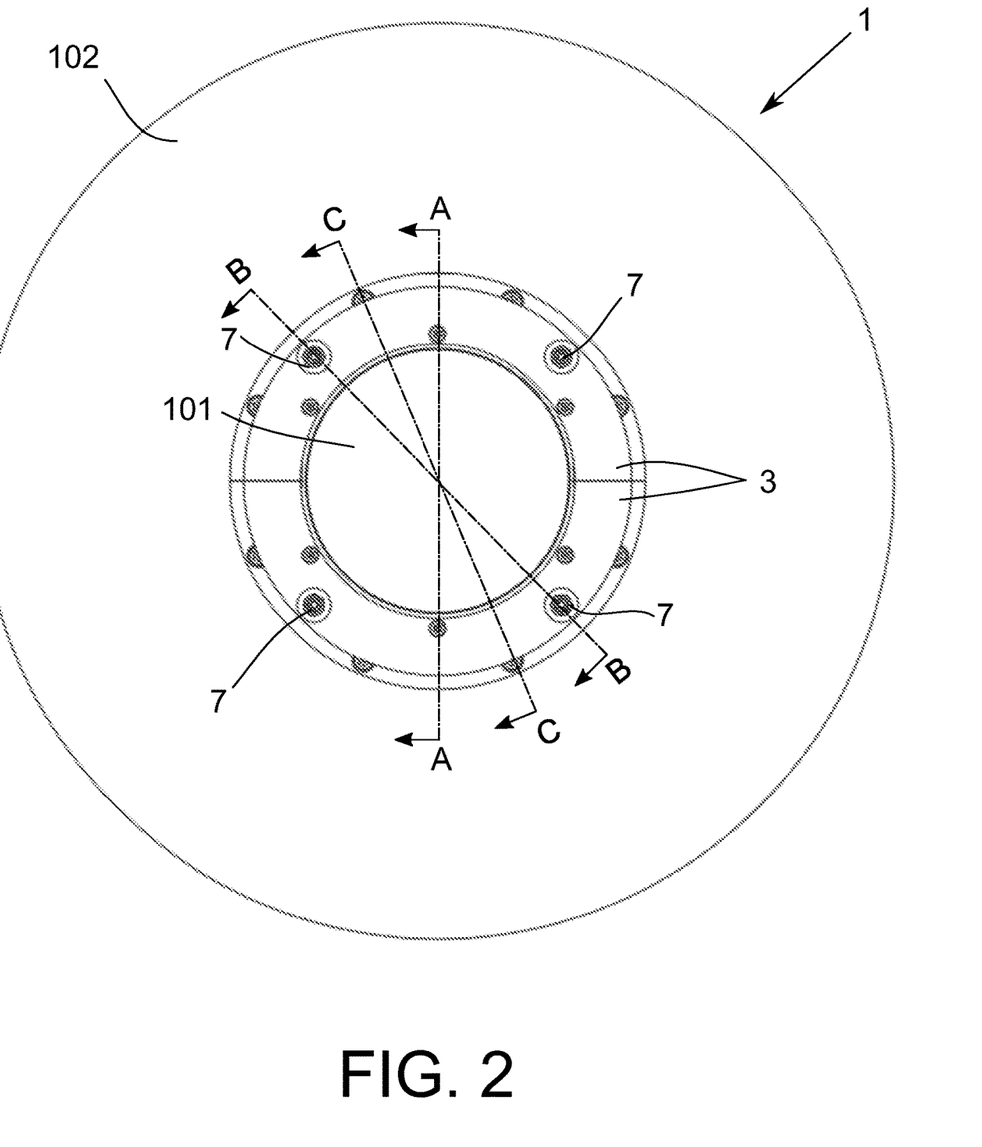
FIG. 2 is a top view of the rotary shaft seal system in FIG. 1.
Figure 4:
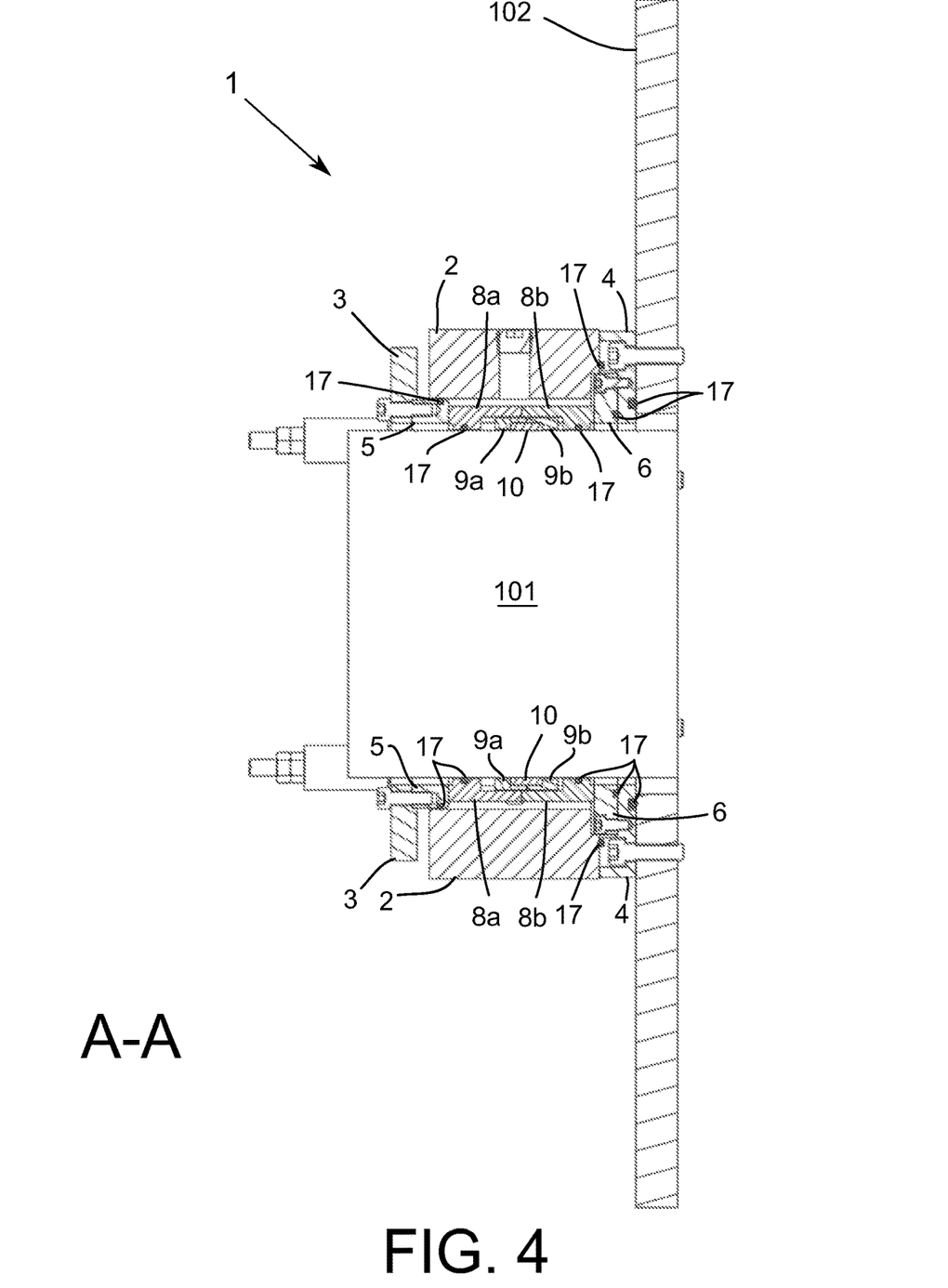
FIG. 4 is a side view of section A-A of FIG. 2.
Figure 5:
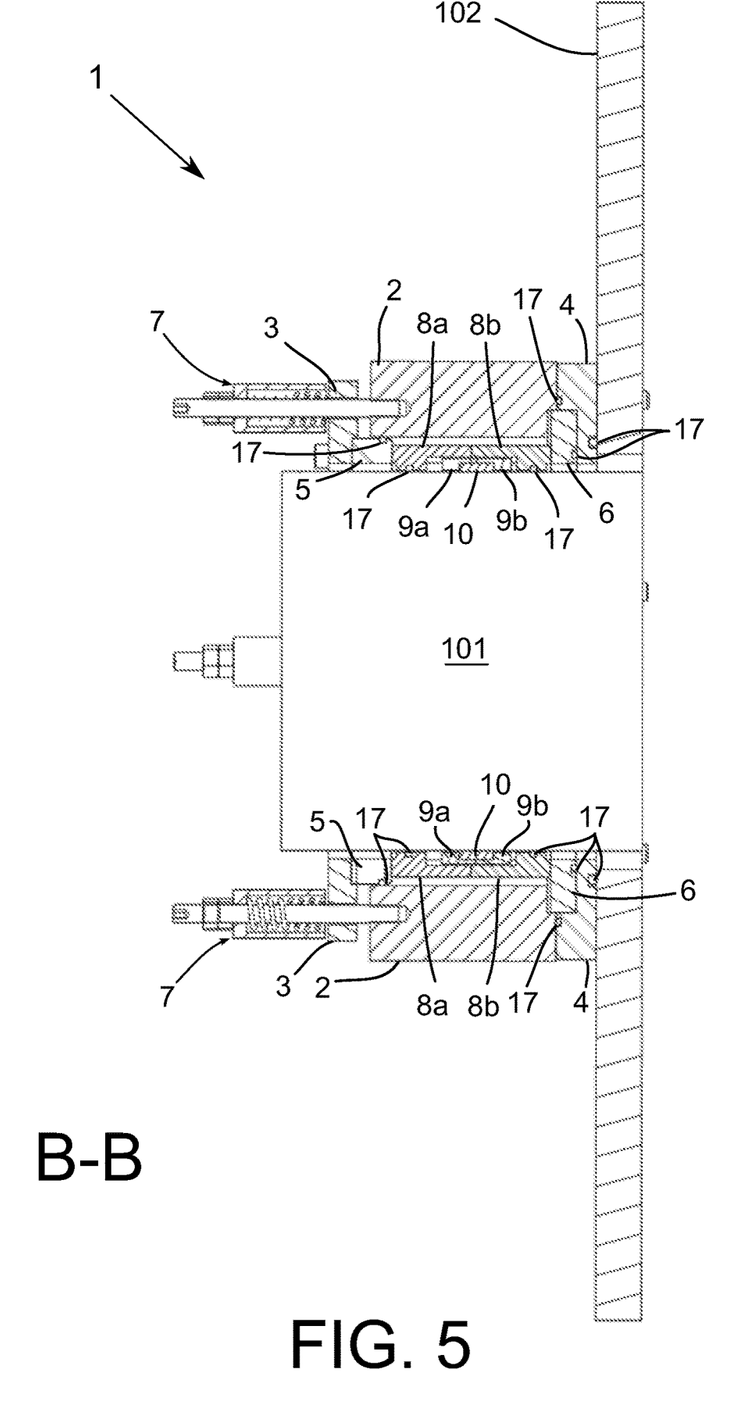
FIG. 5 is a side view of section B-B of FIG. 2.
Figure 6:
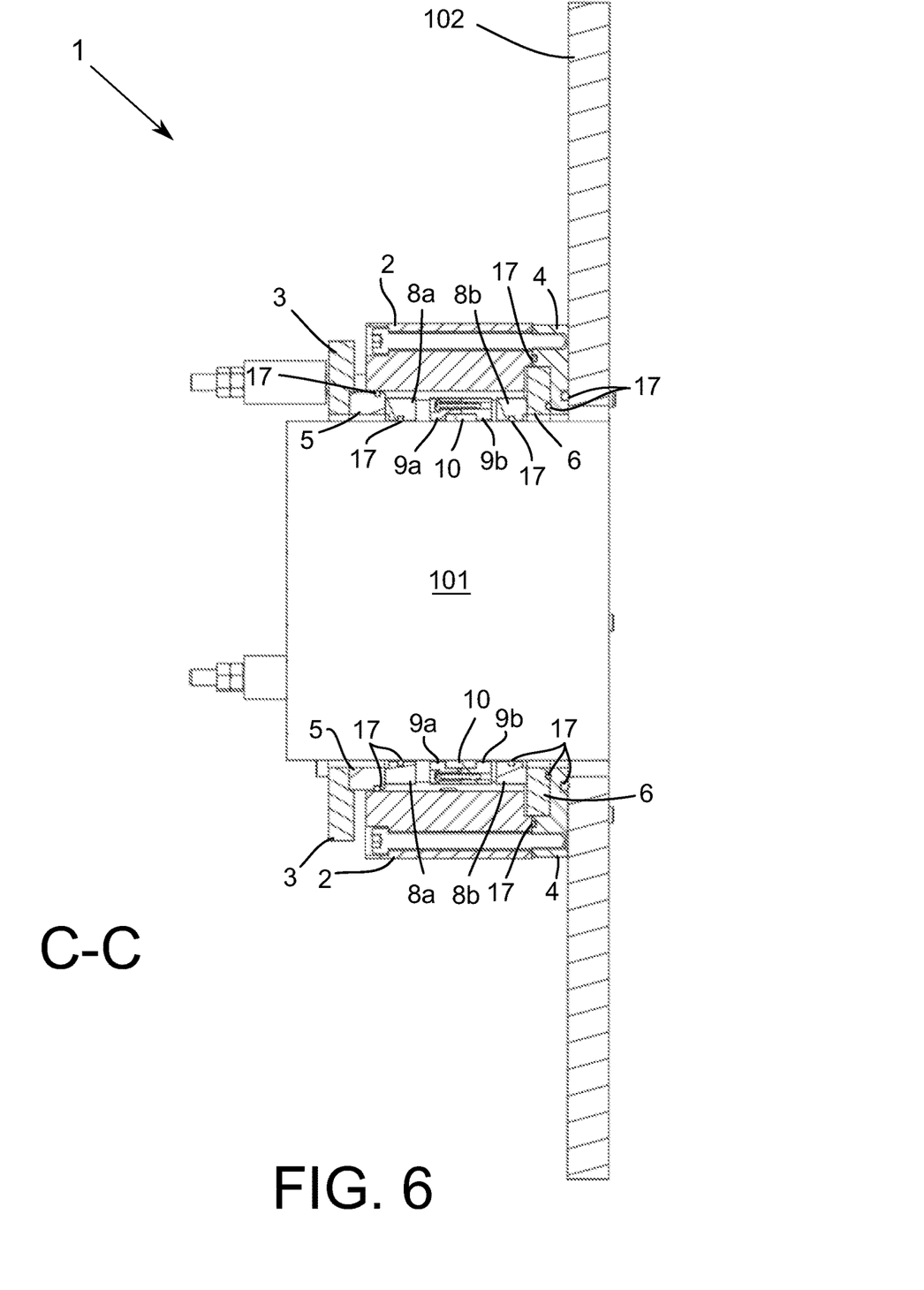
FIG. 6 is a side view of section C-C of FIG. 2.

FIG. 2 is a top view of the rotary shaft seal system 1 with the section A-A, B-B, C-C as shown in FIG. 4, FIG. 5, and FIG. 6, respectively.

Figure 3:
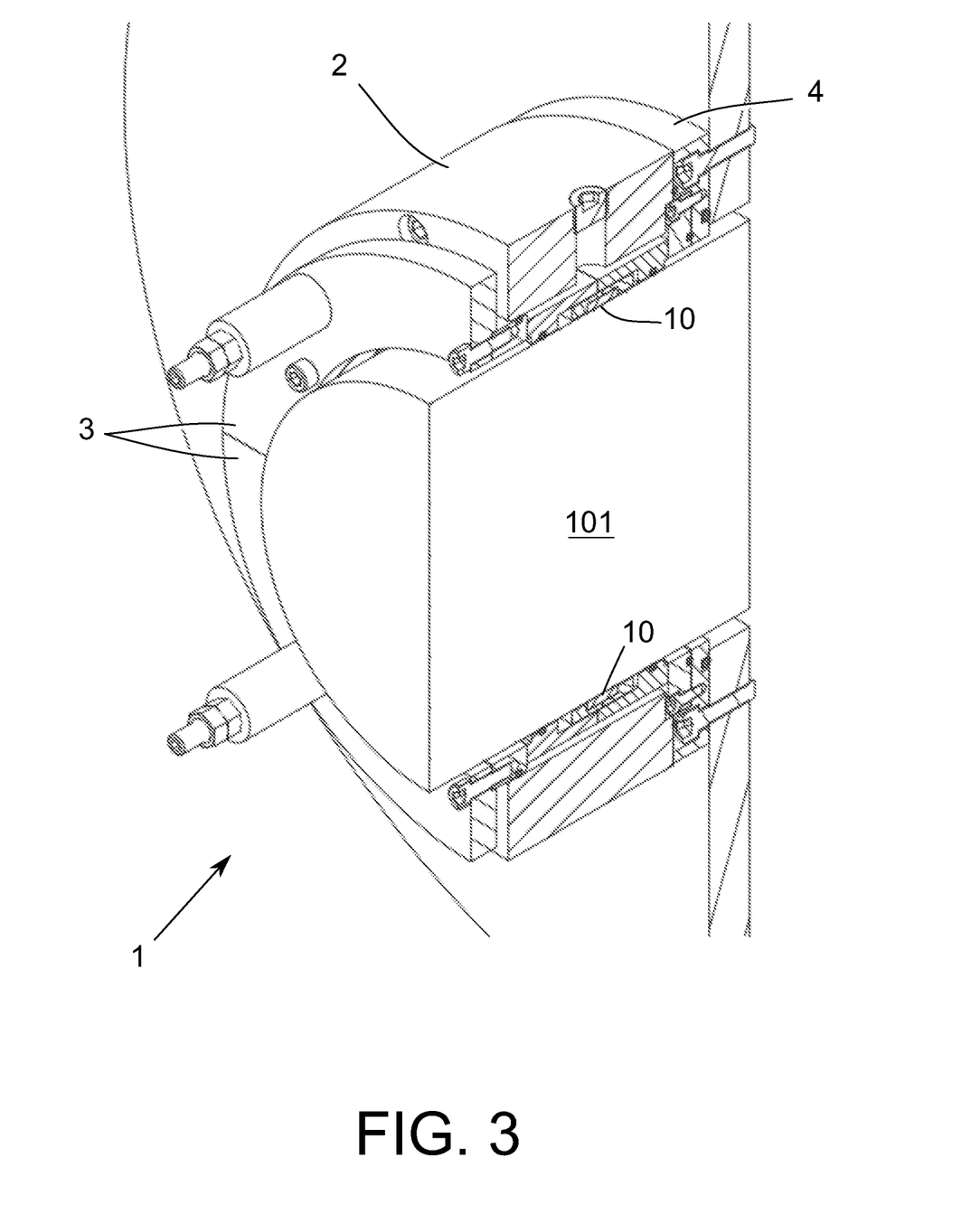
FIG. 3 is a perspective view of section A-A of FIG. 2.

FIG. 3 is section A-A shown from an isometric perspective.

FIG. 4-6 shows the sections A-A, B-B, C-C which are sections of FIG. 2 at different angles. The rotary shaft seal system 1 may further includes a stationary first ring having a first seal face 5 and a stationary second ring having a second seal face 6. The first and second seal faces 5, 6 are located on surfaces that are on planes that extend perpendicular to the axis of the rotating shaft 101. As referred to herein, the first and second stationary rings are sometimes referred to for simplicity as the first and second seal faces with the understanding that these faces are located on the stationary rings. The second seal face 6 being closer to the device wall 102 than the first seal face 5. The sealing base 4 is configured to be fastened onto the device wall 102. The second seal face 6 is configured to be fastened onto the sealing base 4. The housing is also configured to be fastened onto the sealing base 4. The spring bolts 7 are configured to transmit a biasing force to the first seal face 5 of the seal system 1 via the gland follower 3. The spring bolts contain a biasing structure which provides an opposing force as the biasing structure compresses. The rotary shaft seal system may further include a drive collar 9a/9b, a rotor assembly 8a/8b, and a drive ring 10. The drive collar 9a/9b may be of a split design, that is the drive collar 9a/9b may comprise of two (or more) pieces that is configured to be fastened together around the shaft 101. The drive collar is configured to fasten together and compress the drive ring 10, thus locking the drive ring 10 onto the shaft. Rotation of the drive ring with the shaft drives the rotation of the rotatable components of the shaft seal assemblies described herein. The drive ring 10 and drive collar 9a/9b are typically made of flexible materials, preferably the drive ring 10 may comprise of elastomer material and drive collar 9a/9b may comprise of a PEEK polymer material or any other suitable material with a relatively low coefficient of thermal expansion.

Figure 7:
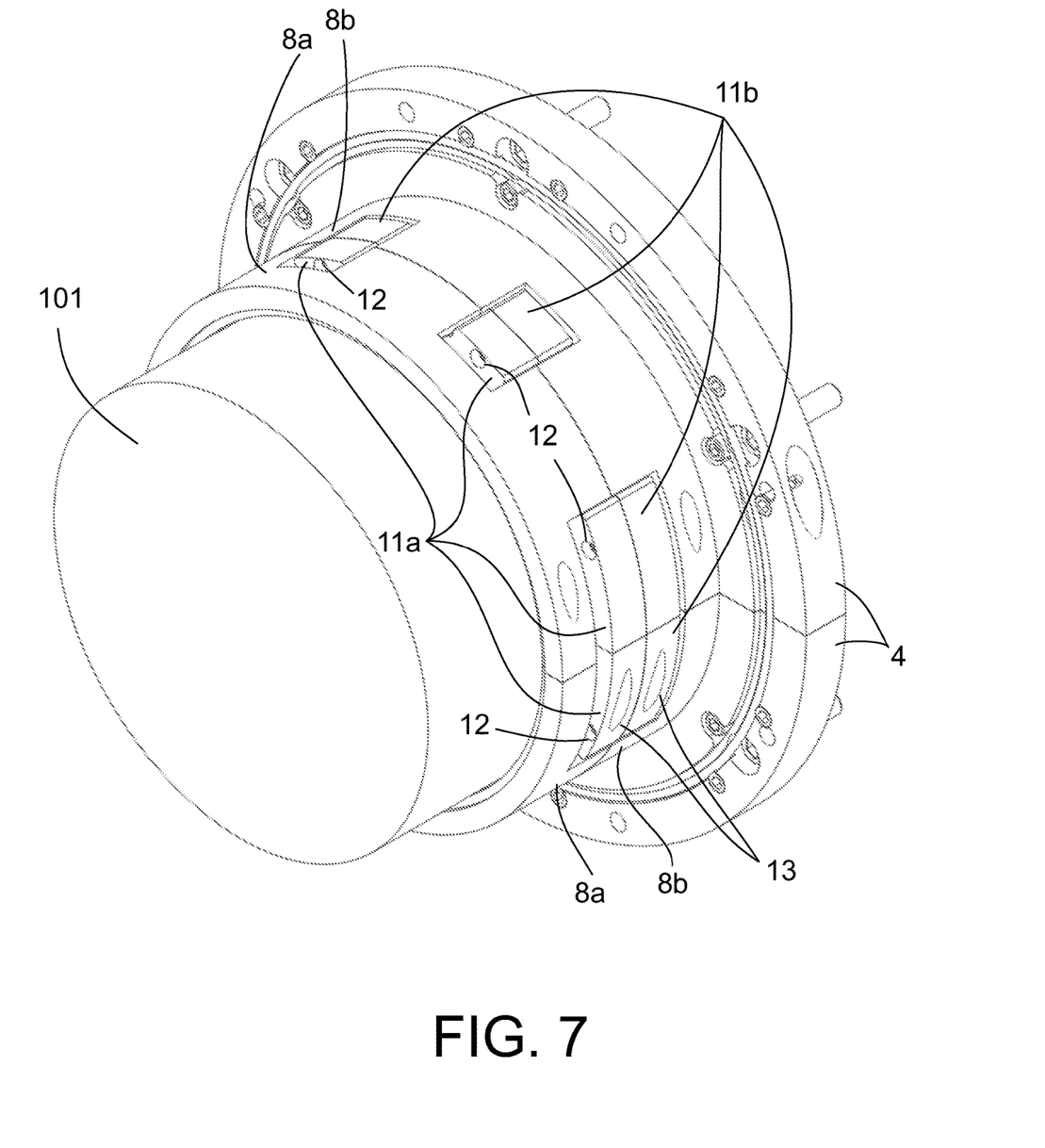
FIG. 7 is an isometric view of the internals of the rotary shaft seal system in FIG. 1.

FIG. 7 shows the exemplary rotary shaft seal system 1 with some outer components removed. The drive collar 9 a/9 b may be nested within the rotatable rotor assembly 8 a/8 b. The rotor assembly includes a first rotor ring 8 a and a second rotor ring 8 b. The drive collar may contain a first drive collar ring 9 a and a second drive collar ring 9 b. Each drive collar ring 9 a/9 b may be in a split configuration. Each portion of the drive collar ring 9 a may be fastened to each other and each portion of the drive collar ring 9 b may be fastened to each other. The drive collar rings 9 a and 9 b include a drive collar projection 11 a and 11 b respectively. Some drive collar projections 11 a and 11 b may be larger to accommodate fastening mechanisms configured to fasten the corresponding split configuration of the drive collar ring 9 a and 9 b. The projections 11 a and 11 b is configured to enter an opening 12 in the rotor assembly 8 a/8 b. Each projection may contain one or more fastening holes 18 configured to fasten drive collar rings 9 a and 9 b together via a fastening mechanism. Each opening 12 in the drive collar 8 correspond to the projections 11 a and 11 b such that the arc length of each opening 12 corresponds to the size of each corresponding projections 11 a and 11 b. The drive collar may also include fastening holes 13 configured to receive a fastening mechanism configured to attach the split configuration of the drive collar 8 together. O-rings 17 shown in the figures may be disposed between components to mitigate purge gas losses.

Figure 8:
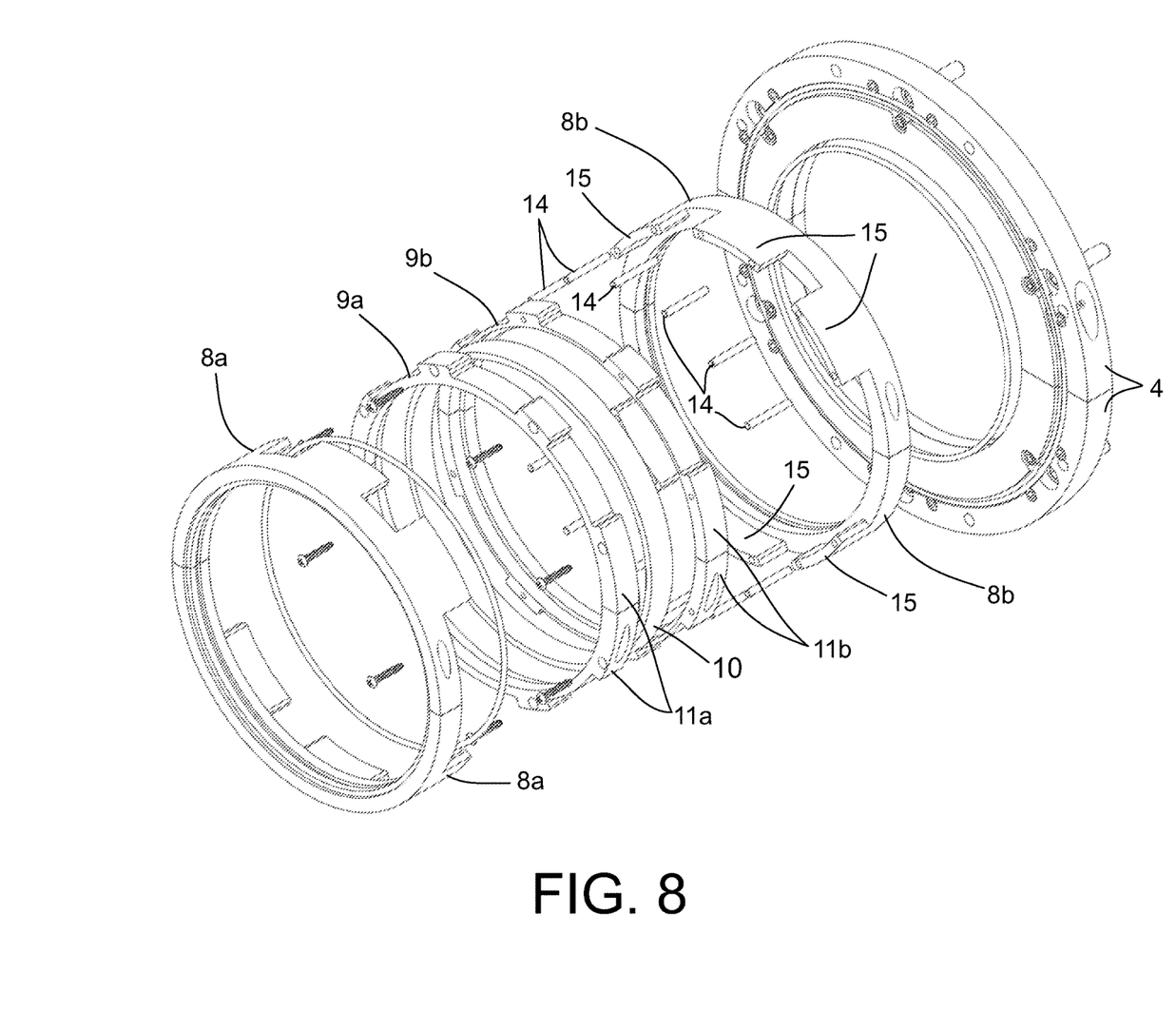
FIG. 8 is an exploded view of the rotary shaft seal system of FIG. 7.

FIG. 8 shows an exploded assembly of the rotary shaft seal system shown in FIG. 7. The rotor assembly 8a/8b may include reinforcement pins 14. Reinforcement pins are configured to be inserted into webs 15 within the first rotor ring 8a and second rotor ring 8b. Reinforcement pins are configured to provide rigidity to the rotor assembly 8a/8b.

Figure 9:
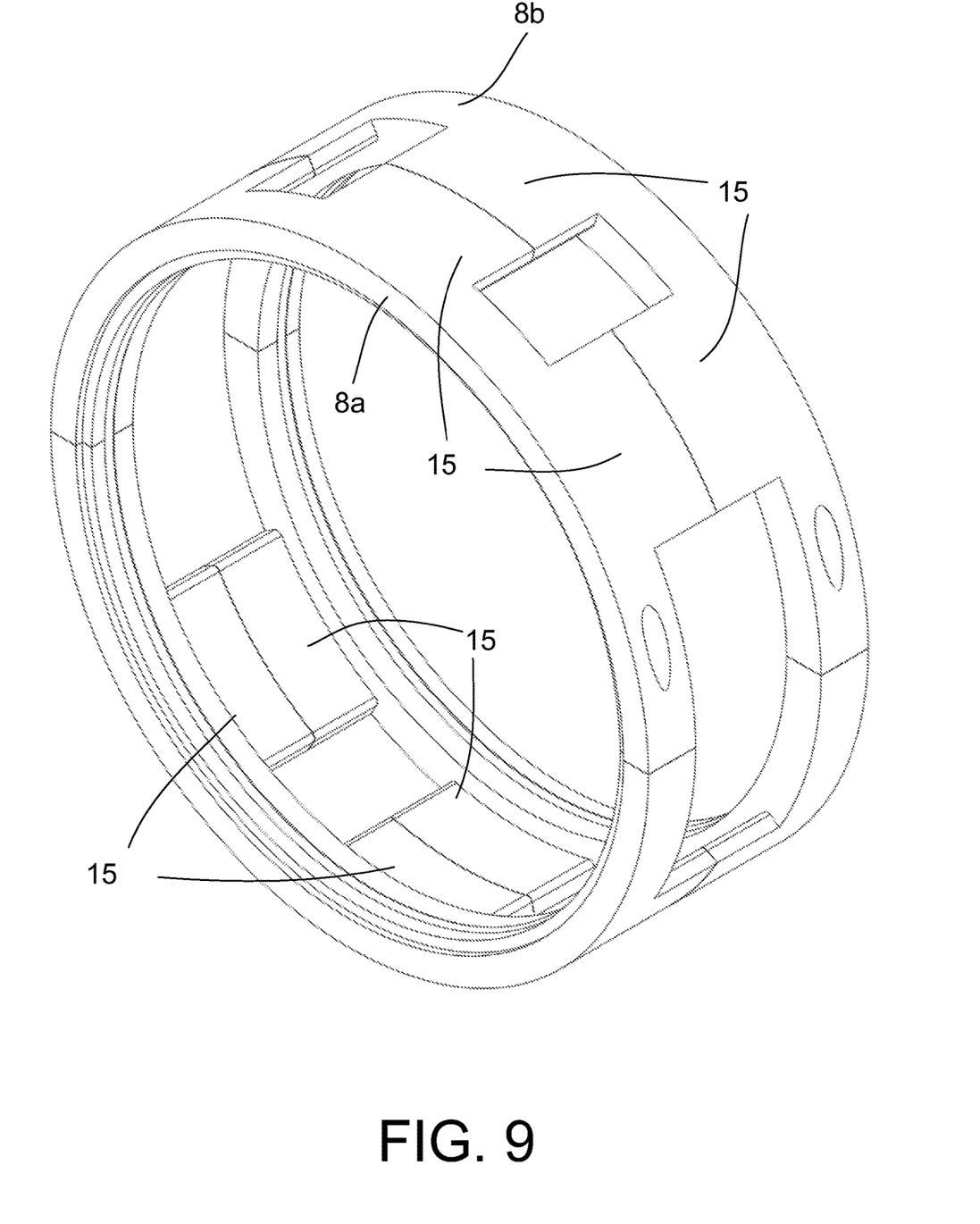
FIG. 9 shows an exemplary rotor assembly.

FIG. 9 shows the rotor assembly 8a/8b in isolation.

Figure 10:
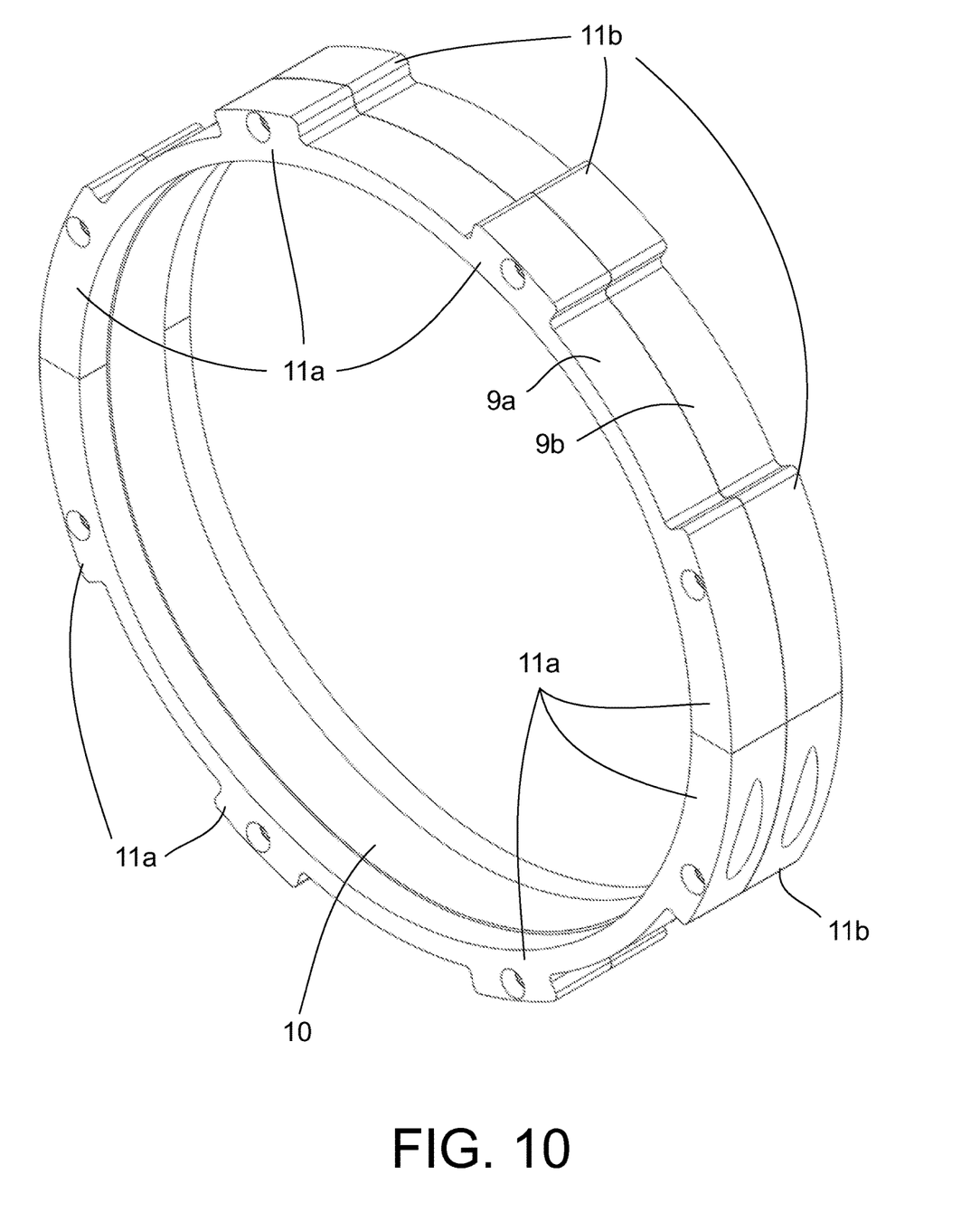
FIG. 10 shows an exemplary drive collar assembly.

FIG. 10 shows the drive collar assembly 9a/9b including the drive ring 10.

In the configuration described above, the rotor assembly 8a/8b interlocks with the drive collar assembly 9a/9b. As the shaft 101 rotates, the torque from the shaft 101 imparts rotation onto the drive collar 9a/9b via the interference fit of the drive ring 10 onto the shaft 101. The rotor assembly 8a/8b then rotates via torque transmitted by the rotation of the drive collar 9a/9b. The first rotor ring 8a and second rotor ring 8b rotate in parallel and in contact with the seal faces 5 and 6 respectively. The spring bolts 7 ensure that the rotor rings 8a and 8b remain in contact with stationary seal faces 5 and 6, respectively, regardless of any axial or radial movement of the shaft. The drive collar 9a/9b may be designed to be reusable, while the rotor assembly 8a/8b and drive ring 10 is typically replaced when rebuilding the seal system.

Figure 11:
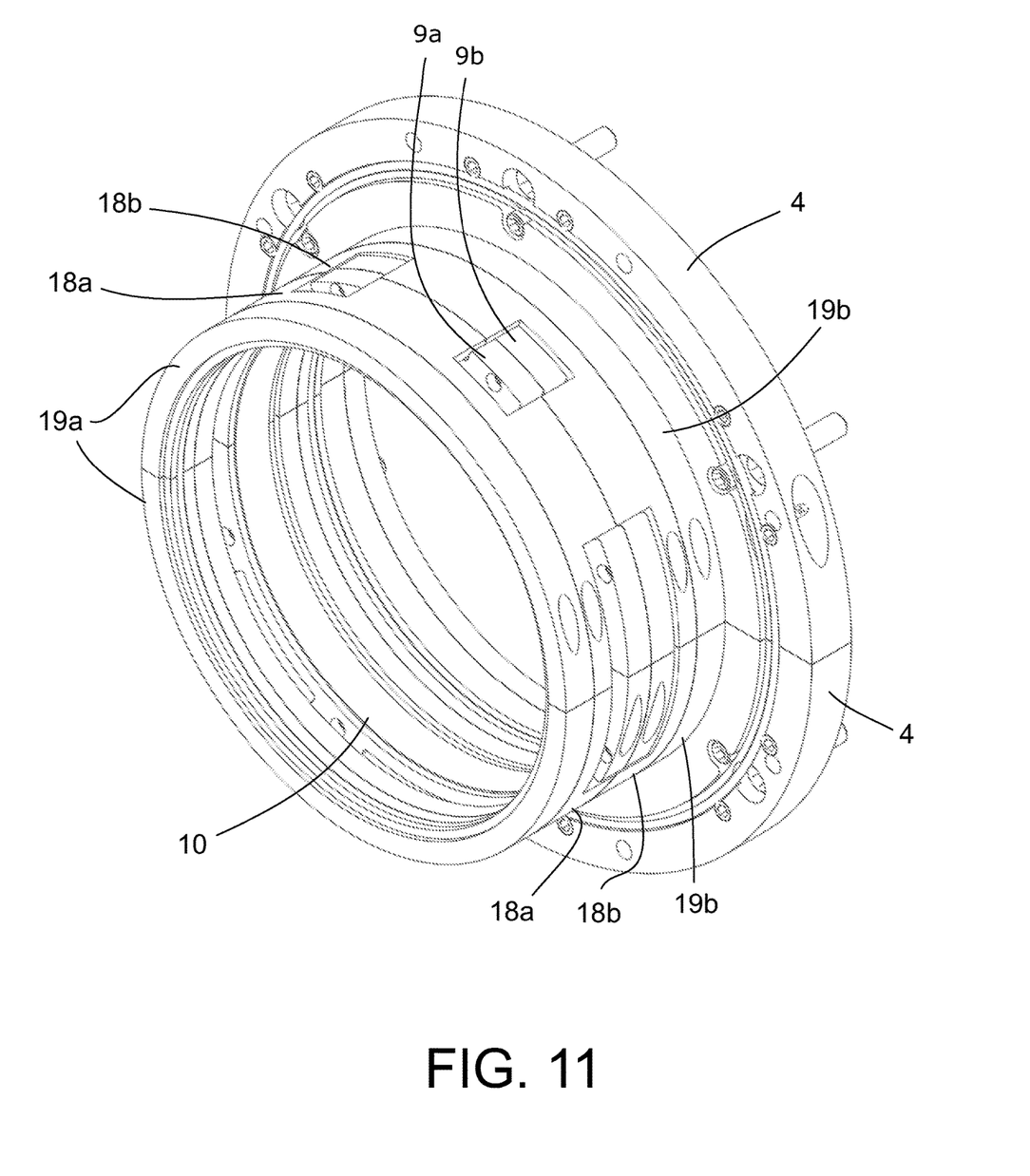
FIG. 11 shows the internals of another exemplary rotary shaft seal system.

FIG. 11 shows an alternative embodiment of the shaft seal system. In this embodiment, the shaft seal system includes a drive collar assembly 9a/9b, a pusher ring assembly 18a/18b, and an outer rotor assembly 19a/19b. The outer rotor assembly includes a pair of rotatable rings 19a, 19b and may be replaced during a rebuild of the seal system.

The pusher ring assembly 18a/18b includes reinforcement pins 20 that extend through the pushing ring assembly on its axial ends. The reinforcement pins 20 is configured to engage outer rotor assembly 19a/19b and to impart torque, when shaft 101 rotates. Reinforcement pins 20 may comprise stainless steel.

Figure 12:
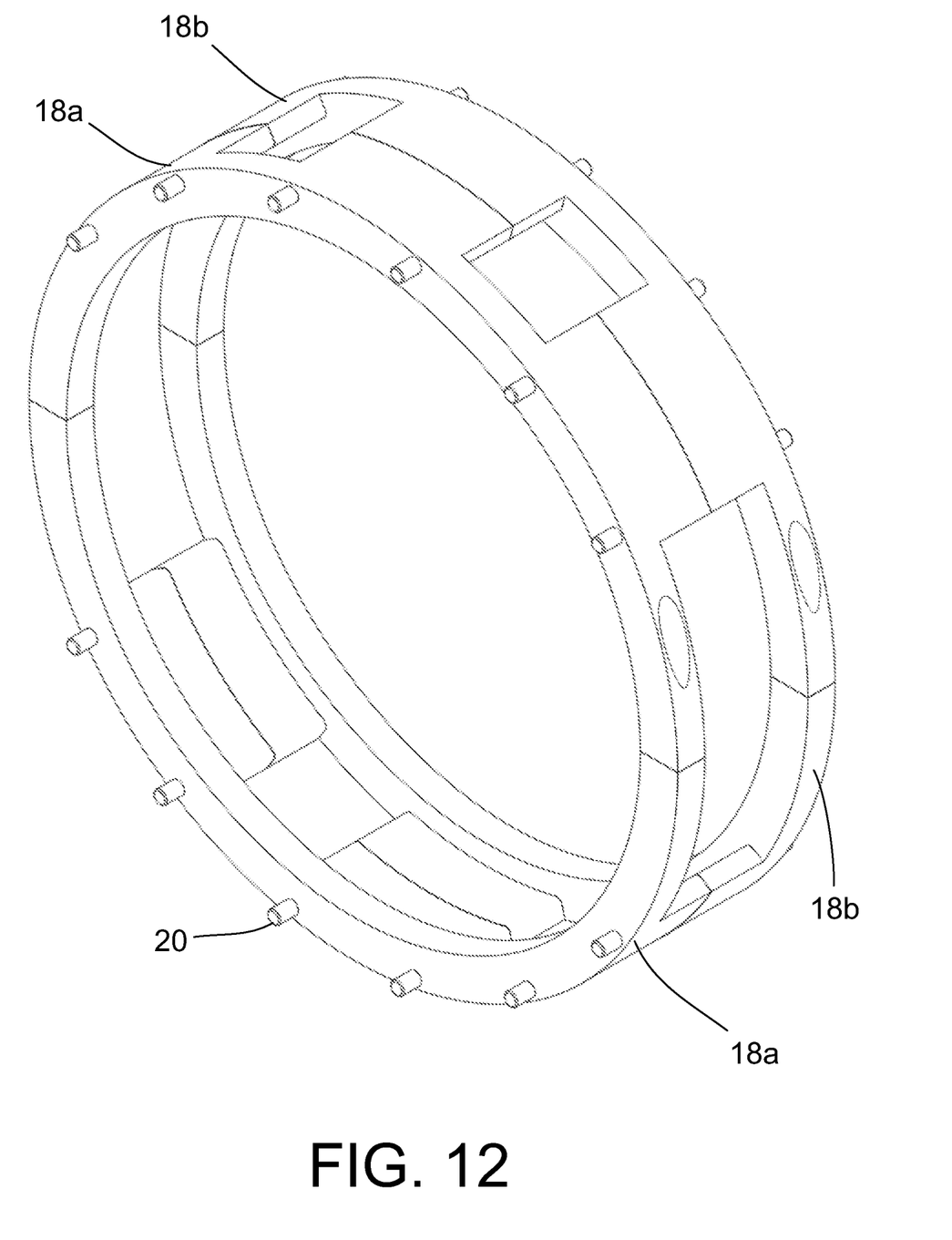
FIG. 12 shows a pusher ring of the rotary shaft seal system shown in FIG. 14.

FIG. 12 shows an isolated view of the pusher ring assembly 18a/18b.

Figure 13:
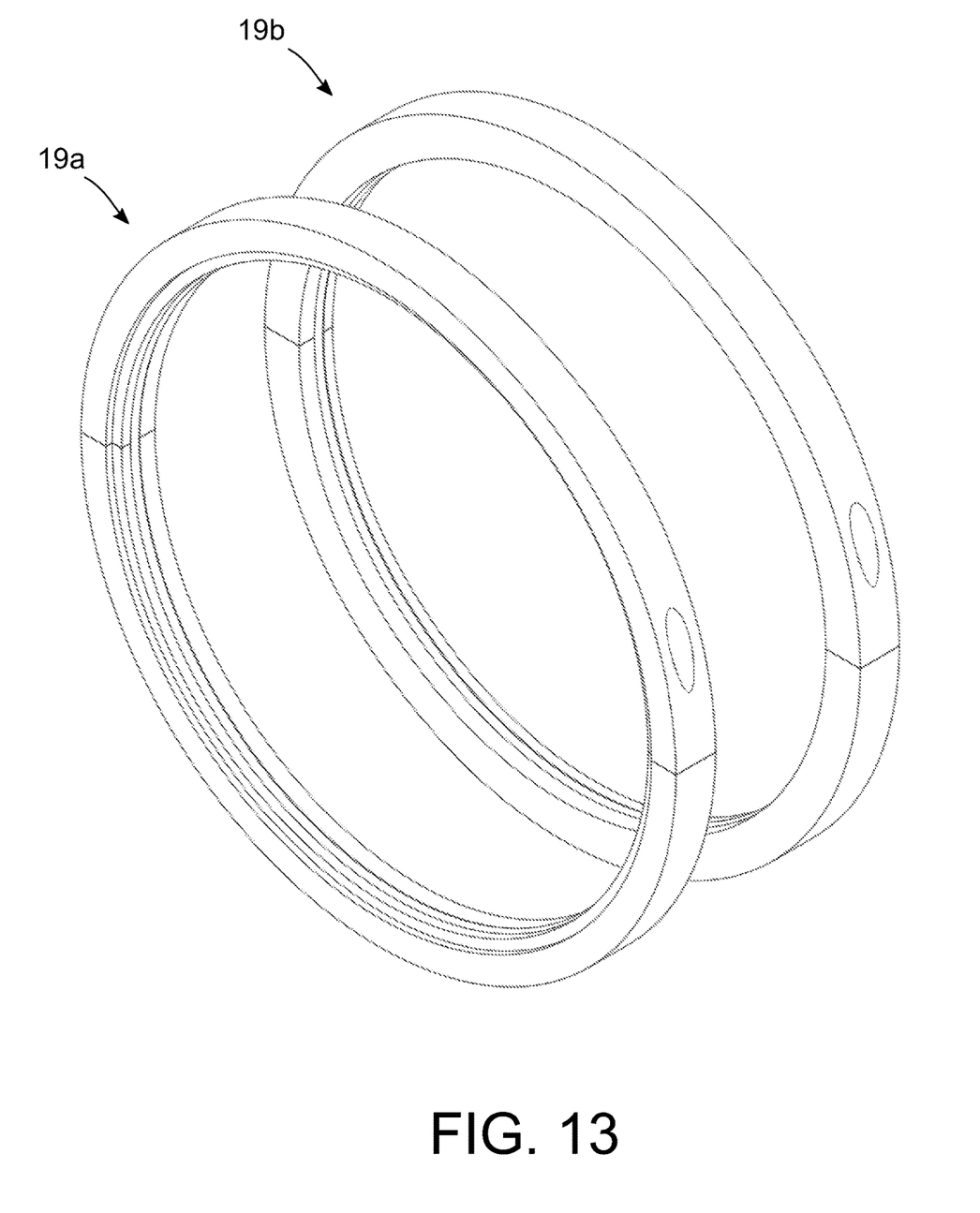
FIG. 13 shows outer rotors of the rotary shaft seal system in FIG. 14.

FIG. 13 shows an isolated view of the outer rotor assembly 19a/19b.

Figure 14:
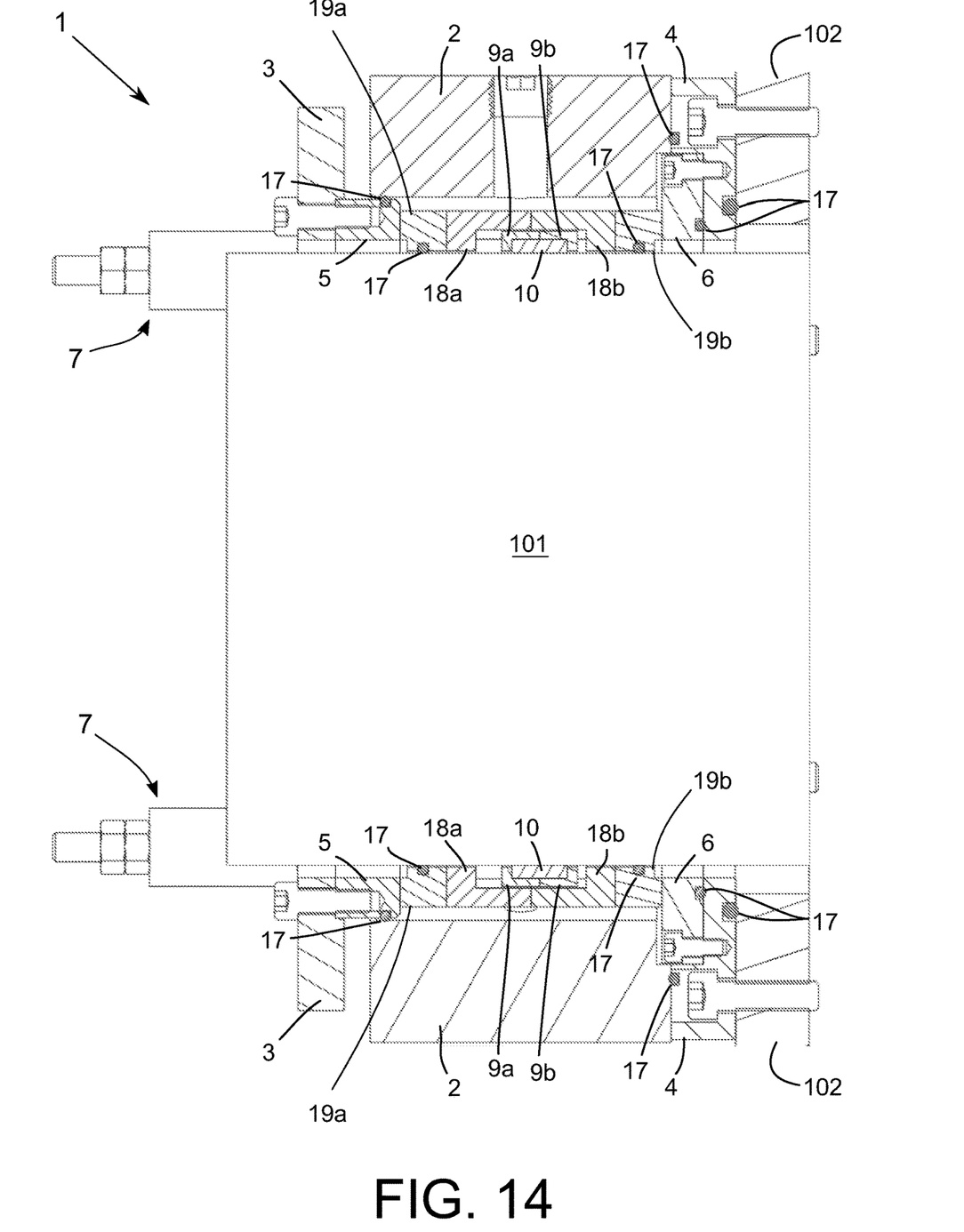
FIG. 14 is a side view of another exemplary shaft seal system sectioned in the same manner as section A-A of FIG. 2.

FIG. 14 shows a section view of the alternative embodiment of the shaft seal system taken at section A-A. As shown in FIG. 2. The same components are present from the first embodiments shown in FIG. 4. However, in this embodiment, the rings of the outer rotor assembly 19a/19b are rotated against seal faces 5 and 6, respectively. Other alternative O-ring configurations may also be employed. For example, an O-ring could be placed between the pusher rings 18a/18b and shaft 101 with another set of O-rings between the rotors 19a/19b and each respective adjacent pusher rings 18a/18b. In this embodiment, the rotors 19a/19b are configured to rotate relative to the stationary seal faces 5 and 6. In the embodiment shown in FIG. 14, the drive collar assembly 9a/9b may be thinner than the embodiment shown in FIGS. 3-10. Although O-rings are described herein, a packing seal may be utilized instead.

In sum, an improved rotary shaft seal system is disclosed herein. The configuration described above permits torque to be applied to the rotors while leaving the shaft free to move axially as a result of thermal growth/shrinkage, design, wear, or operating conditions within the limits of the device. The rotors remain situated in opposing contact with the stationary seal faces regardless of the thrusting movement of the shaft. The non-metallic material of the rotor assembly, drive collar, and drive ring allow for higher temperature operating conditions compared to conventional shaft seal systems and also allows sealing in applications where large internal metal components are prohibited. Additionally, the configuration above allows parts to be reusable and also easily replaceable. For example, drive collar assembly 9a/9b, pusher ring assembly 18a/18b are typically reusable and drive collar ring 10, rotor assembly 8a/8b, and outer rotor assembly 19a/19b are replaceable.

The housing 2 may also include openings configured to allow barrier fluid to enter the housing and/or for attachment of valves for inspection of the seal. The aforementioned openings may be plugged when unused. The barrier fluid is configured to provide pressure to the internal components (8a/8b and 19a/19b) to ensure correct loading forces onto the components to provide the proper sealing.

Fastening mechanism herein may include but are not limited to any combination of fastening structures that include threads such as nuts, bolts, screws, and/or studs.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seal system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A seal assembly for sealing a rotating shaft, the seal assembly comprising:
    a seal housing configured to surround the rotating shaft;
    a drive ring configured to mount onto the rotating shaft via a plurality of drive collars;
    the plurality of drive collars are fastened together to create a pocket that receives the drive ring therein such that the drive ring is surrounded by the drive collars, and wherein the plurality of drive collars are nested within a rotor assembly;
    wherein the rotor assembly is disposed within the seal housing; and
    wherein each of the drive collars includes a projection extending radially outwards through an opening of the rotor assembly, wherein the plurality of drive collars is configured to impart torque to the rotor assembly when the rotating shaft rotates.

2. The seal assembly of claim 1, further comprising a first stationary ring have a first seal face located at a first end of the housing, and a second stationary ring having a second seal face located at a second end of the housing; and wherein the rotor assembly is located between the first and second seal face.

3. The seal assembly of claim 2, further comprising a gland follower located adjacent to and fastened directly onto the first seal face via a first fastener, wherein the gland follower is also fastened directly onto the housing via a second fastener; and wherein the gland follower is configured to bias the first seal face toward the rotor assembly and to bias the rotor assembly toward the second seal face.

4. The seal assembly of claim 3, further comprising a sealing base fastened onto the housing, wherein the sealing base is fastened onto a device wall of a device, and wherein the second seal face is fastened onto the sealing base.

5. The seal assembly of claim 3, wherein the rotor assembly rotates relative to the first and second seal faces.

6. The seal assembly of claim 1, further comprising o-rings circumferentially disposed around the shaft between the rotor assembly and the shaft.

7. A seal assembly for a rotating shaft, the seal assembly comprising:
    a seal housing configured to surround the rotating shaft;
    a drive ring configured to mount onto the rotating shaft via a plurality of drive collars;
    the plurality of drive collars are fastened together to create a pocket that receives the drive ring therein such that the drive ring is surrounded by the drive collar, and wherein the plurality of drive collars are configured to be nested within a pusher ring assembly;
    wherein the pusher ring assembly is disposed within the seal housing;

the pusher ring assembly includes reinforcement pins extending through the pusher ring assembly;
a first outer rotor attached to at least one pin of the reinforcement pins at a first end of the pusher ring assembly;
a second outer rotor attached to the at least one pin of the reinforcement pins at a second end of the pusher ring assembly;
each of the drive collars comprising a projection configured to impart torque to the pusher ring assembly when the rotating shaft rotates; and
the pusher ring assembly is configured to impart torque to the first and second outer rotors when the rotating shaft rotates via the plurality of drive collars.

8. The seal assembly of claim 7, further comprising a first stationary ring including first seal face located at a first end of the housing, and a second stationary ring including a second seal face located at a second end of the housing; and wherein the pusher ring assembly, first outer rotor, and second outer rotor are located between the first and second seal faces.

9. The seal assembly of claim 8, further comprising a gland follower located adjacent to and fastened onto the first stationary ring, wherein the gland follower is also fastened onto the housing; and wherein the gland follower is configured to bias the first seal face toward the first outer rotor and to bias the second outer rotor toward the second seal face.

10. The seal assembly of claim 9, further comprising a sealing base fastened onto the housing, wherein the sealing base is fastened onto a device wall of a device housing the rotating shaft, wherein the rotating shaft passes through the device wall and wherein the second stationary ring is fastened onto the sealing base.

11. The seal assembly of claim 9, wherein the first and second rotors rotate relative to the first and second seal faces, respectively.

12. The seal assembly of claim 7, further comprising a first o-ring circumferentially disposed around the shaft between the first outer rotor and the shaft, and a second o-ring circumferentially disposed around the shaft between the second outer rotor and the shaft.

13. A seal assembly for a rotating shaft of a device, the seal assembly configured to seal a device fluid within the device, the seal assembly including:
a seal housing configured to surround the rotating shaft;
a gland follower fastened onto the housing via a first fastener;
a sealing base fastened onto the device, wherein the seal housing is fastened onto the sealing base,
a first stationary ring including a first seal face, wherein the gland follower is fastened onto the first stationary ring via a second fastener;
a second stationary ring include a second seal face fastened onto the sealing base;
a drive ring configured to mount onto the rotating shaft via a plurality of drive collars, wherein the plurality of drive collars are fastened together to create a pocket that receives the drive ring therein such that the drive ring is surrounded by the drive collar, and wherein the plurality of drive collars is also configured to mount onto the shaft such that both the drive ring and the plurality of drive collars contact the shaft;
an outer rotating seal component configured to be rotationally locked to the plurality of drive collars, wherein the outer rotating seal component is configured to rotate relative to the first seal face and second seal face when the rotating shaft of the device rotates.

14. The seal assembly of claim 13, wherein the drive collar includes a projection.

15. The seal assembly of claim 14, wherein the plurality of drive collars is nested within the outer rotating seal component, the projection configured to impart torque onto the outer rotating seal component.

16. The seal assembly of claim 14, wherein the plurality of drive collars is nested within a pusher ring assembly; and wherein:
the pusher ring assembly is disposed within the seal housing; and
the pusher ring assembly includes reinforcement pins extending through the pusher ring assembly.

17. The seal assembly of claim 16, wherein the outer rotating seal component includes:
a first outer rotor attached to the reinforcement pin at a first end of the pusher ring assembly; and
a second outer rotor attached to the reinforcement pin at a second end of the pusher ring assembly.

18. The seal assembly of claim 13, further comprising o-rings located between the shaft and the outer rotating seal component.

19. The seal assembly of claim 17, wherein the reinforcement pins extends through the webs of the pusher ring assembly.

20. The seal assembly of claim 19, wherein each of the drive collar projections extend between the webs of the pushing ring assembly.

* * * * *